United States Patent [19]

Westlin et al.

[11] 4,124,362
[45] Nov. 7, 1978

[54] SNAP TOGETHER HEADER AND CELL SIDE ASSEMBLY

[75] Inventors: Karl L. Westlin; Herbert V. Cork, Jr., both of Louisville, Ky.

[73] Assignee: American Air Filter Company, Inc., Louisville, Ky.

[21] Appl. No.: 816,589

[22] Filed: Jul. 18, 1977

[51] Int. Cl.² .............................................. B01D 27/08
[52] U.S. Cl. ...................................... 55/509; 55/500; 55/DIG. 31
[58] Field of Search ................. 55/DIG. 31, 494, 499, 55/506, 509, 497, 495; 210/483, 495, 496, 493 R

[56] References Cited

U.S. PATENT DOCUMENTS

| 3,001,246 | 9/1961 | Mather | 55/DIG. 31 |
|---|---|---|---|
| 3,075,334 | 1/1963 | Nutting | 55/357 |
| 3,076,303 | 2/1963 | Durgeloh | 55/DIG. 31 |
| 3,659,719 | 5/1972 | Westlin et al. | 210/483 |

Primary Examiner—William A. Cuchlinski, Jr.
Assistant Examiner—Jon Hokanson
Attorney, Agent, or Firm—Jon C. Winger

[57] ABSTRACT

A filter assembly including a filter frame with filter media disposed therein and a border flange arranged to engage the edge of the filter frame, the border frame being clamped to the frame by a deformable resilient clamp which is inserted between the filter frame and the flange.

4 Claims, 4 Drawing Figures

SNAP TOGETHER HEADER AND CELL SIDE ASSEMBLY

BACKGROUND OF THE INVENTION

The present invention relates to a filter frame construction, and more particularly to a border flange and clamp arrangement for engaging with the filter frame edge.

In the art of fluid filtration, it is desirable to mount fluid treating filter media into a sturdy frame which can be readily handled during operation and storage. It is further desirable that such a frame presents a minimum of sharp corners to reduce problems of cutting and tearing. These filter frame attributes are particularly desirable where filter media of considerable depth of utilized, such as in filter constructions where the filter media extends back and forth in pleated fashion across the fluid stream to be treated with the walls of the pleats of filter media being held in spaced relation from each other by spacer members. Such type of filter constructions are most commonly used for high efficiency filtration with the frames often being made of rigid materials. With frames of this nature, it is not only important that the frame construction be sturdy but it is equally important that bowing and racking be minimized, as well as fluid leakage between the served parts of the construction.

SUMMARY OF THE INVENTION

The present invention is an improvement to the already successful filter frame construction disclosed in U.S. Pat. No. 3,659,719 issued on May 2, 1972 to Karl L. Westlin and Wilson A. Welch by providing for an even more sturdy filter frame assembly without additional structure.

More particularly, the present invention provides, in a unit filter assembly comprising: a peripheral filter frame including upstream and downstream edges defining open upstream and downstream faces, respectively, to permit fluid flow therethrough; filter media disposed within the frame transverse the direction of fluid flow between the upstream and downstream faces; a peripheral border flange attached to at least the upstream edge of the peripheral filter frame, the border flange having a generally U-shaped transverse cross-sectional shape comprised of a base leg portion and a pair of opposed inner and outer leg portions extending therefrom; wherein the improvement comprises:

a clamping flange comprising:
(a) a base leg integrally formed with and projecting obliquely outwardly from one edge of the filter frame at an acute angle to the side wall of the filter frame; and,
(b) an outer leg projecting obliquely from the projecting end of the base leg at an obtuse angle to the base leg and extending in a direction generally back over the side wall of the filter frame, the clamping flange means being wedged into the U-shaped border flange through the opening between the inner and outer leg portions thereof such that the outer surface of the inner leg portion of the border flange is in parallel abutment with the inner surface of the wall of the filter frame and the free end of the outer leg of the clamping flange is in tight abutment with the outer leg of the border flange.

BRIEF DESCRIPTION OF THE DRAWINGS

A better understanding of the present invention will be had upon reference to the accompanying drawings in which like numerals refer to like parts throughout the several views and in which.

DESCRIPTION OF THE PREFERRED EMBODIMENT

Figure 1:
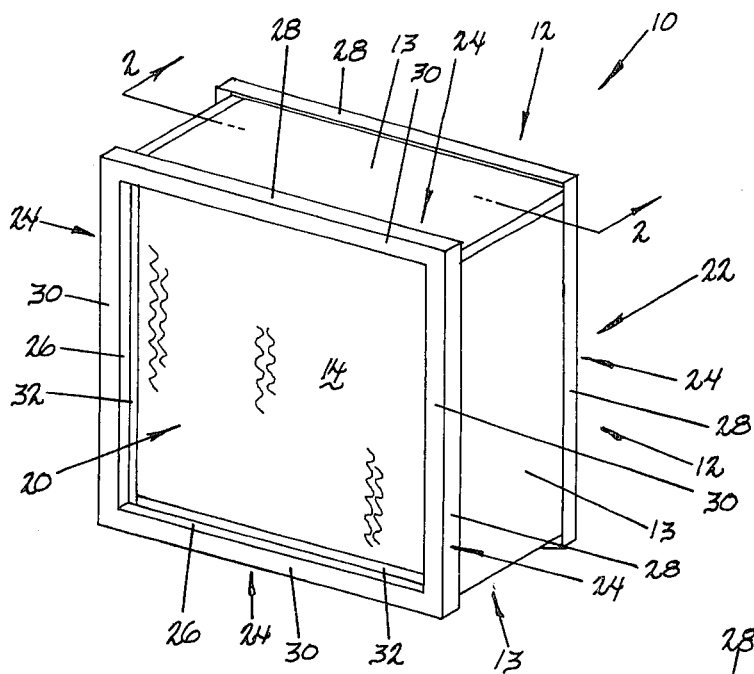
FIG. 1 is an isometric view of a unit filter assembly incorporating the present invention.
Figure 2:
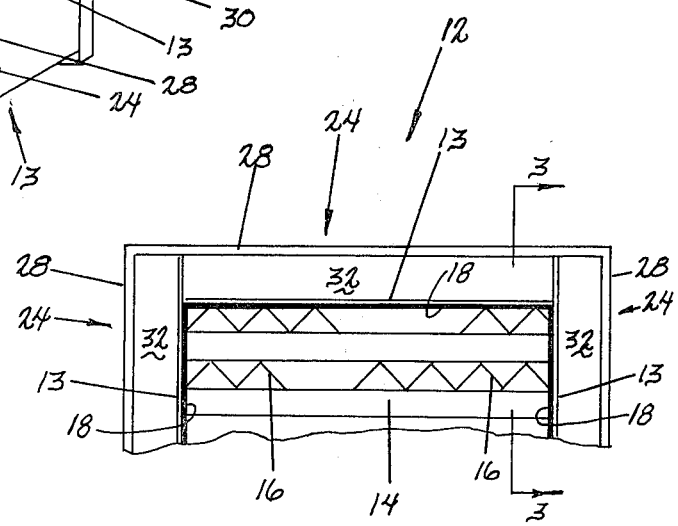
FIG. 2 is an enlarged, partially broken-away cross-sectional view taken in the plane of line 2—2 and viewed in the direction of arrows 2—2 in FIG. 1.

Referring to FIG. 1, there is shown a rectangular filter assembly, generally denoted as the numeral 10, including a rectangular peripheral filter frame 12, comprised of four cell sides 13, which encloses the periphery of and supports a filter media 14. The filter media 14 is illustrated as a pleated media. That is, it is in the form of a sheet of filter material extending back and forth in pleated fashion upon itself and disposed in the filter frame with the pleat folds thereof transverse to the gaseous stream to be filtered. The adjacent pleats are held apart from each other by, for example, corrugated spacer members 16. Such type of filter assembly is known in the art and, therefore, the assembly of the filter media 14 within the frame 12 itself is not disclosed in detail. Filter assemblies of this type are most commonly used where high filtering efficiencies are desired, providing a maximum amount of filter media in a given space.

The filter frame 12 can be made from any one of a number of suitable rigid materials such as, for example, sheet metal or pressed fiber board. A suitable sealant 18 is utilized between the edges of the filter media 14, spaced members 16 and the inner surface of the filter frame 12 to prevent gas leakage therearound.

The upstream and downstream edges of the peripheral filter frame 12 define an open upstream face 20 and open downstream face 22, respectively, to permit flow of the gas stream to be filtered through the media 14. The upstream and downstream edges of the peripheral frame 12 each comprise a peripheral border flange 24 to prevent bowing and racking of the peripheral frame 12, and serve as a means for fastening together the various components of the filter frame. As can be best seen in FIGS. 3 and 4, each border flange 24 is generally U-shaped in transverse cross-section and comprises a pair of opposed inner and outer leg portions 26 and 28, respectively, and a base leg portion 30. The inner and outer leg portions 26, 28 extend normally to the base leg portion 30 and in parallel relationship to each other. The free end of the outer leg portion 28 can be folded back upon itself to form a shoulder generally denoted as the numeral 29. Accordingly, when the border flange 24 is assembled to the peripheral filter frame 12 (as can be seen in FIG. 4) the base leg portion 30 extends outwardly from the cell side 13 of the filter frame 12 with the outer leg portion 28 extending is spaced substantially parallel relationship to the cell side 13 of the peripheral frame 12. It is to be noted that the inner leg portion 26 has integral therewith a terminal filter media retaining portion 32 which extends normally therefrom in an opposite direction that the base leg portion 30. This terminal retaining portion 32 abuts against the periphery of the face of the filter media 14 serving to restrain the filter media and at the same time further assuring against possible gas leakage between the filter media edges and the inner surface of the filter frame 12.

Figure 3:
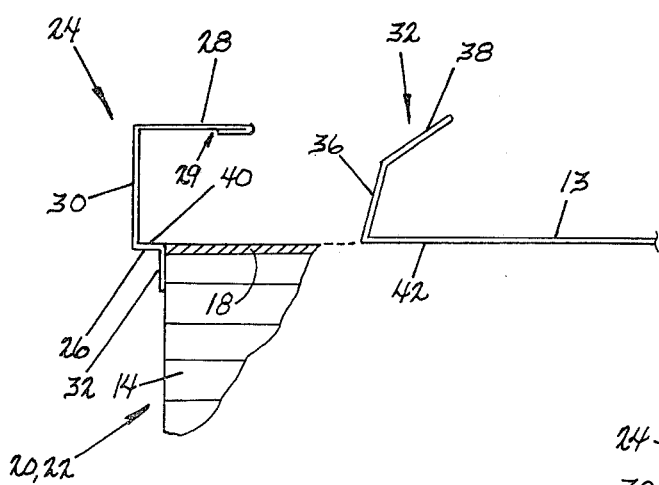
FIG. 3 is a cross-sectional exploded view of a portion of the unit filter assembly as viewed in the direction of arrows 3—3 in FIG. 2; and, FIG. 4 is the same cross-sectional view as FIG. 3, but illustrating the components assembled.
Figure 4:
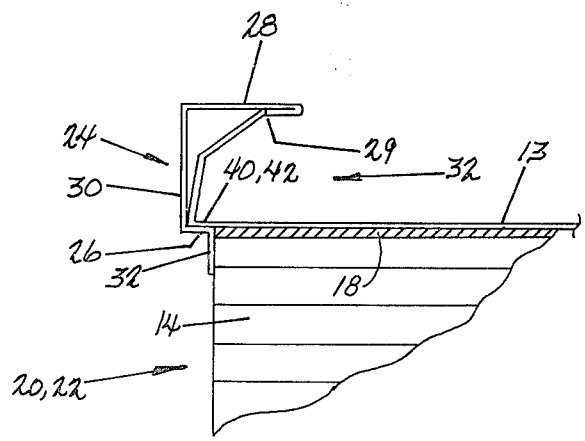

As can be best seen in FIGS. 3 and 4, each cell side 13 comprises an integral clamping flange 32 forming its upstream edge and another identical clamping flange 32 forming its downstream edge. The clamping flange 32 is generally L-shaped an transverse cross-section and is comprises of a base leg 36 integrally formed with and projecting obliquely outwardly from the upstream or downstream edge, as the case may be, of the cell side 13, and an outer leg 38 projecting obliquely from the projecting end of the base leg 36 and extending in a direction generally back over, but spaced from, the cell side 13. The angle formed between the base leg 36 and cell side 13 is an acute angle while the angle formed between the base leg 36 and outer leg 38 is an obtuse angle. In practice it has been determined that an acute angle of approximately 80° and an obtuse angle of approximately 106° works well. Further, it should be noted that the distance from the cell side 13 to the projecting end of the base leg 36 from which the outer leg 38 projects, as measured along a line perpendicular to the cell side 13, is less than the distance between the parallel inner and outer leg portions 26 and 28 of the border flange 24. It should furthermore be noticed that the distance from the cell side 13 to the free end of the outer leg 38 of the clamping flange, as measured along a line perpendicular to the cell side 13, is greater than the distance between the parallel inner and outer leg portions 26 and 28 of the border flange 24.

The clamping flange 32 is inserted between the inner and outer leg portions 26 and 28 of the border flange 24 such that the outer surface 40 of the inner leg portion 26 is in parallel abutment with the inner surface 42 of the cell side 13. The base leg 36 and outer leg 38 of the L-shaped clamping flange 32 are resiliently displaced in order to fit into the space between the inner and outer leg portion 26 and 28. When the free end of the outer leg 38 of the clamping flange 32 registers with the shoulder 29 formed in the outer leg portion 26 of the border flange 24, it is biased toward the shoulder and, thus, is firmly seated in the shoulder 19.

The foregoing detailed description is given primarily for clearness of understanding and no unnecessary limitations should be understood therefrom for modifications will become obvious to those skilled in the art upon reading this disclosure and may be made without departing from the spirit of the invention or the scope of the appended claims.

I claim

1. A unit filter assembly comprising:
    a peripheral filter frame having upstream and downstream peripheral edges defining open upstream and downstream faces, respectively, to permit fluid flow therethrough;
    a filter media disposed within the filter frame transverse the direction of fluid flow between the open upstream and downstream faces of the peripheral filter frame;
    a first border flange attached to the upstream edge of the peripheral filter frame, the first border flange having a generally U-shaped transverse cross-section defined by a base leg portion and a pair of opposed inner and outer leg portions extending therefrom, the base leg portion extending therefrom, the base leg portion extending outwardly of the upstream peripheral edge of the peripheral filter frame with the outer leg portion extending in spaced substantially parallel relationship to the side wall of the filter frame, the inner leg portion of the first border flange having a terminal filter media retaining portion extending normal therefrom and in abutment with the periphery of the filter media at the open upstream face of the filter frame to restrain the filter media in the filter frame; and,
    first clamping means comprising a base leg integrally formed with and projecting obliquely outwardly from the upstream edge of the filter frame at an acute angle to the side wall of the filter frame; and, an outer leg projecting obliquely from the projecting end of the base leg at an obtuse angle to the base leg and extending in a direction generally back over the side wall of the filter frame, the first clamping means being wedged into the U-shaped motor flange of the opening between the inner and outer leg portions thereof such that the surface of the inner leg portion interior to the U-shaped cross-section of the first border flange is in parallel abutment with the side wall of the peripheral filter frame adjacent the upstream edge of the filter frame and the free end of the outer leg of the first clamping means is in tight abutment with the outer leg of the first border flange to maintain the first border flange in tight fixed position on the filter frame.

2. The unit filter device of claim 1 wherein:
    the acute angle formed between the side wall of the filter frame and the base leg of the first clamping means is approximately 80°; and,
    the obtuse angle formed between the base leg of the first clamping means and the outer leg of the first clamping means is approximately 106°.

3. The unit filter assembly of claim 1 further comprising:
    a second border flange attached to the downstream peripheral edge of the peripheral filter frame, the second border flange also having a generally U-shaped transverse cross-section defined by a base leg portion and a pair of opposed inner and outer leg portions extending therefrom, the base leg portion extending outwardly of the downstream peripheral edge of the peripheral filter frame with the outer leg portion extending in spaced substantially parallel relationship to the side wall of the filter frame, the inner leg portion of the second border flange having a terminal filter media retaining portion extending normal therefrom and in abutment with the periphery of the filter media at the open downstream face of the filter frame to restrain the filter media in the filter frame; and,
    second clamping means comprising a base leg integrally formed with and projecting obliquely outwardly from the downstream edge of the filter frame at an acute angle to the side wall of the filter frame; and, an outer leg portion projecting obliquely from the projecting end of the base leg at an obtuse angle to the base leg and extending in a direction generally back over the side wall of the filter frame, the second clamping means being wedged into the U-shaped border flange between the opening between the inner and outer leg portions thereof such that the surface of the inner leg portion interior to the U-shaped cross-section of the second border flange is in parallel abutment with the side wall of the peripheral filter frame adjacent the downstream edge of the filter frame and the free end of the outer leg of the second clamping means is in tight abutment with the outer leg of the second border flange to maintain the second border flange in tight fixed position on the filter frame.

4. The unit filter device of claim 3 wherein:

(a) the acute angle formed between the side wall of the filter frame and the base leg of the first clamping means is approximately 80°; and, the obtuse angle formed between the base leg of the first clamping means and the outer leg of the first clamping means is approximately 106°; and, (b) the acute angle formed between the side wall of the filter frame and the base leg of the second clamping means is approximately 80°; and, the obtuse angle formed between the base leg of the second clamping means and the outer leg of the second clamping means is approximately 106°.

* * * * *